(No Model.) 5 Sheets—Sheet 1.
H. G. O'NEILL.
CASH REGISTER AND INDICATOR.
No. 498,079. Patented May 23, 1893.

WITNESSES
Jesse Heller.
Philip C. Masi

INVENTOR
Henry G. O'Neill
by E. W. Anderson
his Attorney (No Model.)  5 Sheets—Sheet 2.
H. G. O'NEILL.
CASH REGISTER AND INDICATOR.
No. 498,079. Patented May 23, 1893.
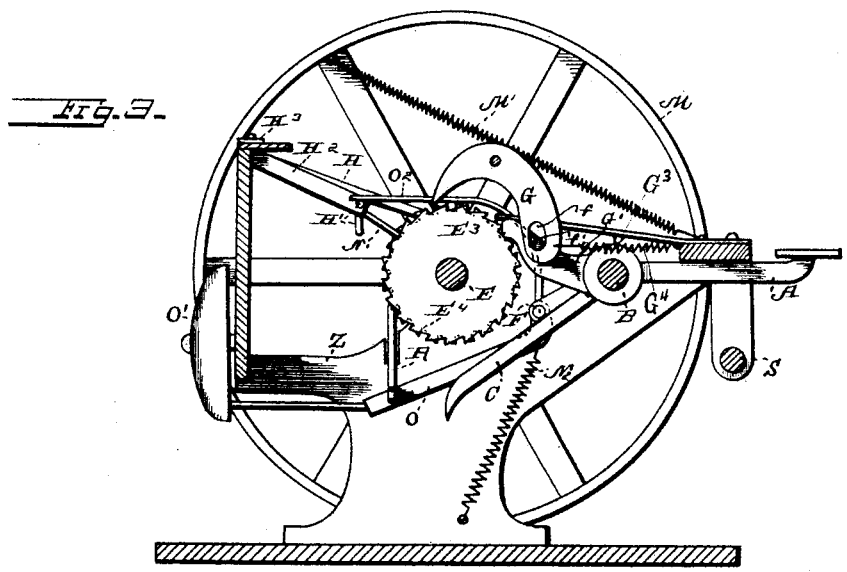
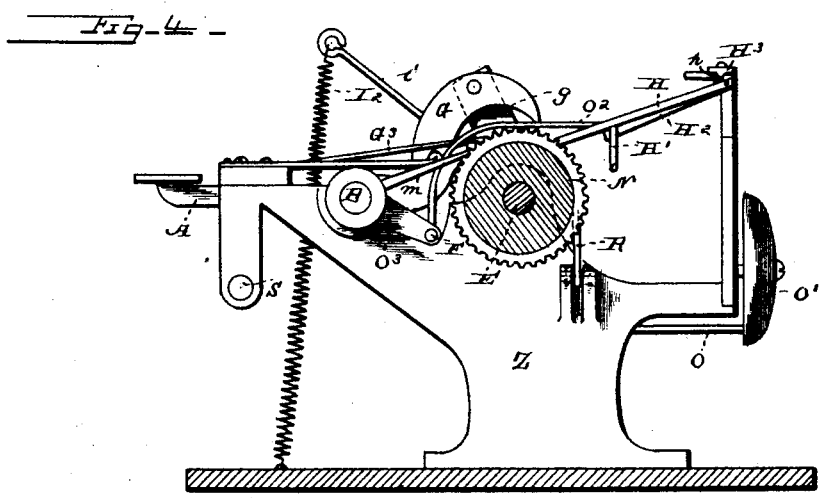

(No Model.) 5 Sheets—Sheet 3.

H. G. O'NEILL.
CASH REGISTER AND INDICATOR.

No. 498,079. Patented May 23, 1893.

WITNESSES
Jesse Heller.
Philip C Mass.

INVENTOR
Henry G. O'Neill
by E. W. Anderson
his Attorney (No Model.) 5 Sheets—Sheet 4.
H. G. O'NEILL.
CASH REGISTER AND INDICATOR.

No. 498,079. Patented May 23, 1893.

WITNESSES
Jesse Heller.
Philip C. Masi.

INVENTOR
Henry G. O'Neill
by E. W. Anderson
his Attorney (No Model.) 5 Sheets—Sheet 5.
H. G. O'NEILL.
CASH REGISTER AND INDICATOR.
No. 498,079. Patented May 23, 1893.
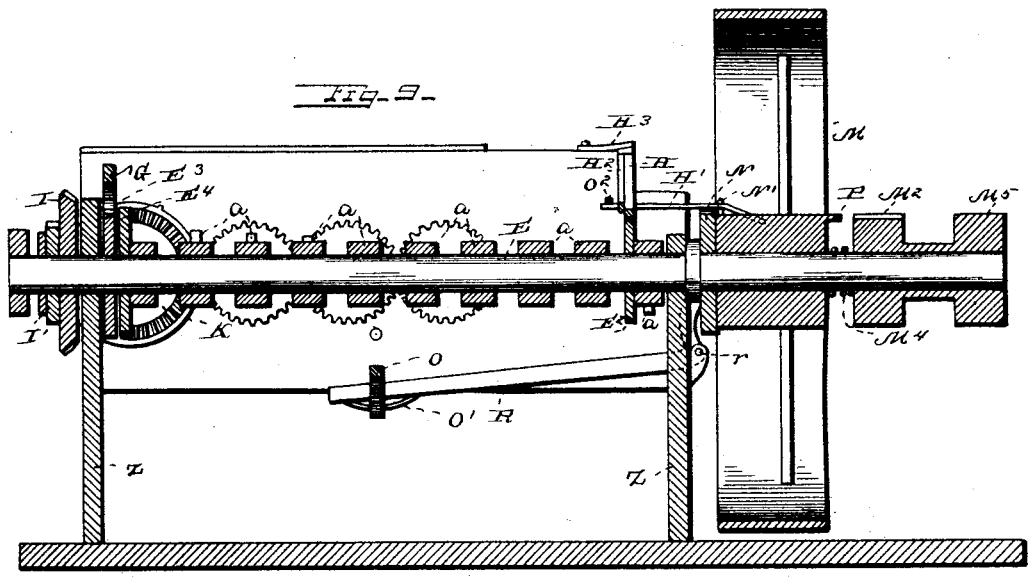
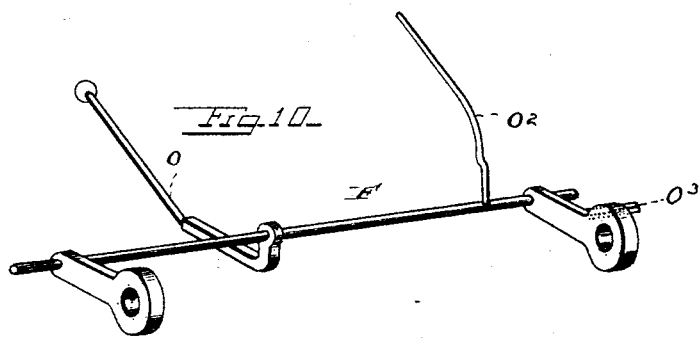
WITNESSES
Jesse Hiller
Philip C. Masi
INVENTOR
Henry G. O'Neill
by E. W. Anderson
his Attorney

UNITED STATES PATENT OFFICE.

HENRY G. O'NEILL, OF BOSTON, MASSACHUSETTS, ASSIGNOR TO THE STANDARD MANUFACTURING COMPANY OF MAINE, OF SAME PLACE.

CASH REGISTER AND INDICATOR.

SPECIFICATION forming part of Letters Patent No. 498,079, dated May 23, 1893.

Application filed December 14, 1892. Serial No. 455,171. (No model.)

*To all whom it may concern:*

Be it known that I, HENRY G. O'NEILL, a citizen of Great Britain, and a resident of Boston, in the county of Suffolk and State of Massachusetts, have invented certain new and useful Improvements in Cash-Registers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
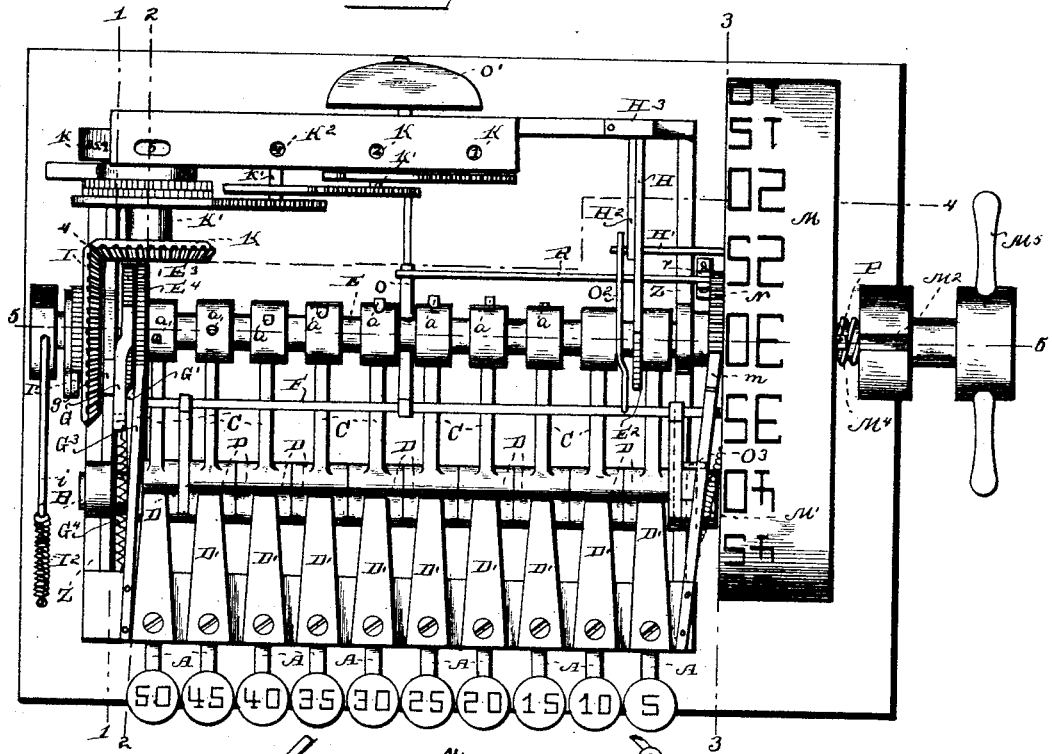
Figure 2:
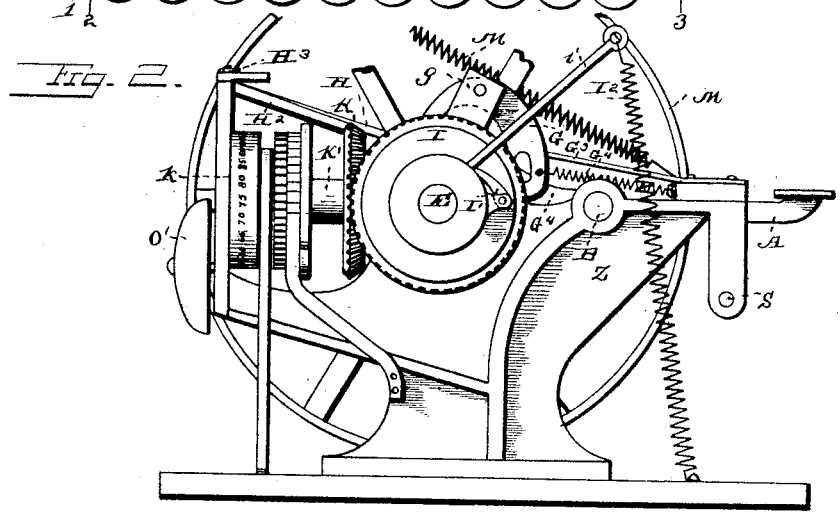
Figure 5:
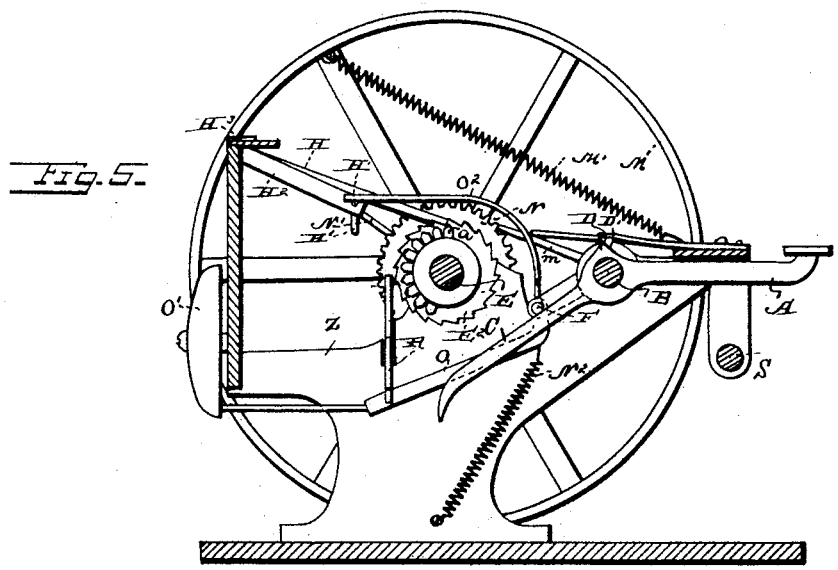
Figure 6:
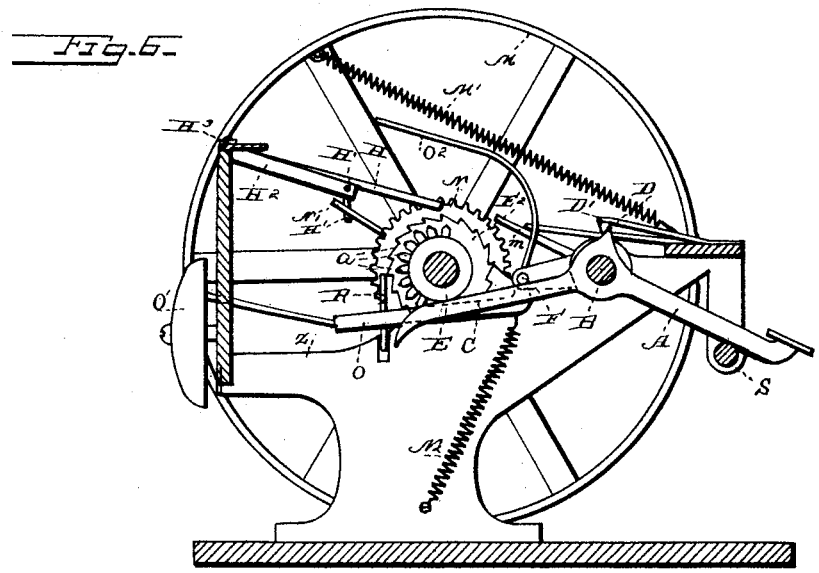
Figure 7:
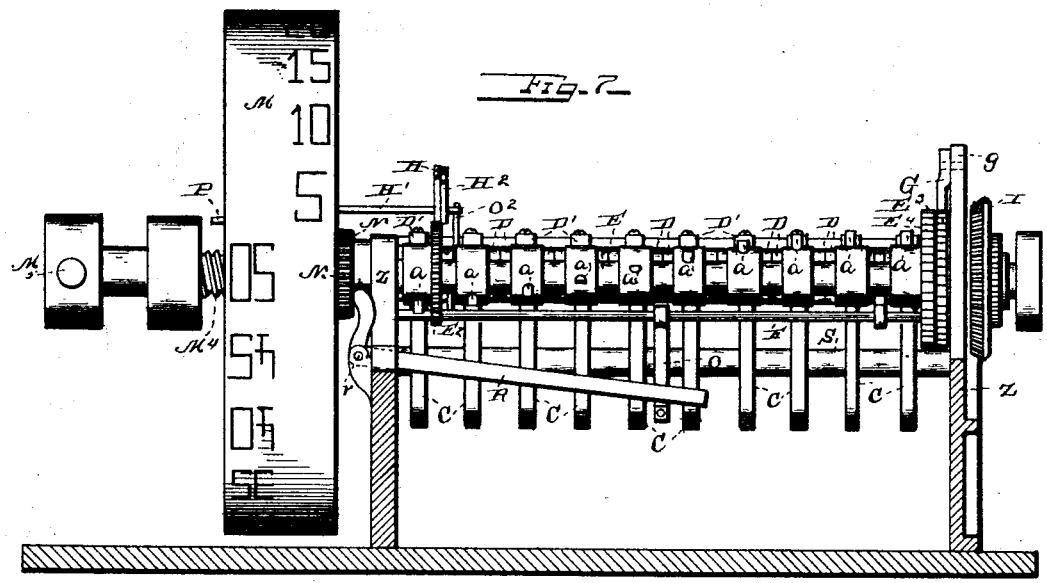
Figure 8:
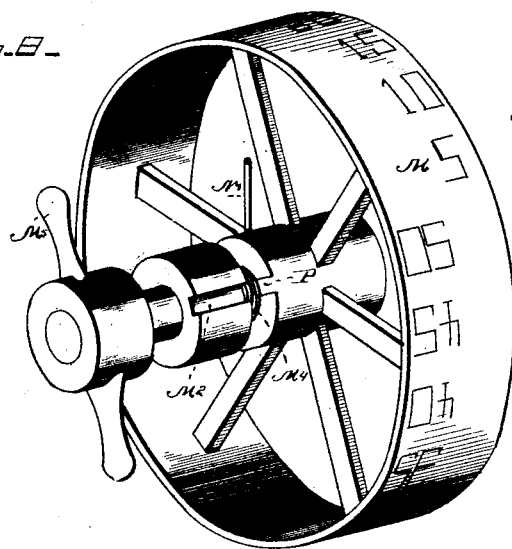
Figure 11:
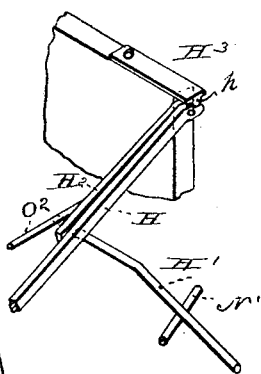

Figure 1 is a top plan view. Fig. 2 is an end view. Fig. 3 is a vertical section on line 1—1, Fig. 1, with adding mechanism removed. Fig. 4 is a vertical section on line 3—3, Fig. 1 with adding mechanism removed. Fig. 5 is a vertical section on line 2—2, Fig. 1, with adding mechanism removed. Fig. 6 is a similar view with key depressed, the other keys being omitted. Fig. 7 is a vertical longitudinal section on line 4—4, Fig. 1. Fig. 8 is a perspective view of the indicator wheel. Fig. 9 is a vertical longitudinal section on line 5—5, Fig. 1. Fig. 10 is a perspective view of the bail bar. Fig. 11 is an enlarged detail view of pawl mechanism.

This invention has relation to certain new and useful improvements in that class of accounting machines known as cash registers and indicators, and is designed to produce an efficient and convenient means for the registration and indication of cash receipts and sales.

A further object of the invention is the simplification of this class of machines, and with it, compactness, and freedom from derangements, as well as reduction in cost.

With these objects in view the invention consists in the novel construction and combination of parts, all as hereinafter described and pointed out in the claims.

Referring to the accompanying drawings, the letter Z indicates the framework of the machine, which should be of such form as to provide support and bearing for the various parts to be described, and with a view to neatness and compactness.

A designates a series of key levers, fulcrumed at their intermediate portions on a rod or shaft B, which extends longitudinally of the frame. Said levers carry a series of finger pieces at their outer extremities which may be marked with any form of notation best suited to the particular purpose for which the machine is designed. In the drawings I have illustrated a system wherein the lowest value key is marked with "5," the series progressing in multiples of five up to "50."

E designates a shaft which is journaled longitudinally of the frame, transversely of the series of keys, and which has, around its circumference, throughout its length, a series of lugs, or projections, $a$, which are placed in line with their respective keys, and correspond in number to the number of said keys. The position of each of these lugs on the circumference of the shaft, depends upon the value of its respective key lever, and must be such as to come in contact with the rear extremity C of said lever, when the latter is depressed its full stroke, in order to stop the rotation of said shaft when it shall have turned through an arc of a circle corresponding to the denomination or value of the key. Each key lever, over its point of fulcrum, is formed with an angular projection D, which is designed to be engaged by a double acting spring pawl D′, whereby the key may be retained in its depressed position until the shaft E is operated. One of these pawls is provided for each key, and is situated over the same, its forward end being secured to the front portion of the frame. Rigidly mounted on said shaft E, toward the left-hand extremity thereof (*i. e.* facing the machine) are two toothed wheels $E^3$, and $E^4$, having their teeth pointing in reverse directions; *i. e.*, the teeth on $E^3$ pointing forward, and those on $E^4$, backward; and toward the right hand extremity of the said shaft is another toothed wheel $E^2$, also rigidly mounted. The wheels $E^3$ and $E^4$ are engaged respectively by the pawls G and G′, the latter swinging upon the rod or shaft B, which forms the fulcrum for the key levers, and is raised by the operation of a bail bar F, hereinafter to be described. Said pawl is held to its normal position by means of a leaf spring $G^3$. The pawl G is pivoted to an upright $g$, above said shaft, and is curved, having a groove or channel $f$ at its lower portion, into which projects a lug or pin $f'$ from the pawl G', so that the movements of the two pawls are reciprocal one moving into engagement with its wheel as the other moves out of engagement with the other wheel. To the lower extremity of the pawl G is attached a coiled or helical spring $G^5$, the other end of which is attached at a point on the front frame of the machine. The construction and arrangement of these pawls are best shown in Fig. 3. The object of this double arrangement of pawls, is not only to prevent back lash, and to overcome momentum, but to prevent the reverse movement, or return, of the shaft before it has made the revolution prescribed or regulated by the key depressed that corresponds to the amount to be registered, thus affording a check against any attempt at deception.

The wheel $E^2$, is acted upon by a pawl H, pivoted on back the frame of the machine, said pawl resting upon an arm H', that is attached to a pivoted support $H^2$, centering on the same pivot as the pawl H. A projection $h$ on said support $H^2$, is acted upon by a spring $H^3$, secured at the back of the frame, said projection being rounded off at its upper portion so that the spring may be capable of a double action on same.

Loosely mounted on the left hand end portion of the shaft E, is a bevel-toothed wheel I, having a ratchet and pawl connection I' with the said shaft, so arranged that said toothed wheel moves only with the forward movement of the shaft, remaining stationary upon the return of the same. Connected to an arm $i$ on the end of said shaft is a helical or coiled spring $I^2$, the other end of which is fastened to the base of the machine. Said spring serves to return the shaft to its normal position upon the completion of its movement.

K is a bevel gear wheel which meshes with the toothed wheel I, said bevel gear wheel K being carried by a short shaft K', which also carries the first wheel $k$, of a series of adding wheels $K^2$. In the drawings I have shown the series $K^2$ as composed of four wheels mounted on parallel short shafts, or axle studs $k'$, projecting from the back frame, said wheels having suitable gearing whereby the surplus registration from one wheel is transferred to the next succeeding one of the series. As I have set forth and claimed this arrangement of adding mechanism in previous patents granted to me, they need not now be more fully described. I may also, if desired, employ other suitable form of adding mechanism.

To the right of the wheel $E^2$, and loosely mounted on the shaft E, is an indicator wheel M, which is of considerable diameter. Said indicator wheel has marked, in duplicate, upon its periphery, the numerals corresponding to those on the finger pieces of the keys, the two series being parallel, and differently placed, so that corresponding numbers may simultaneously appear at the sight slots at both front and rear of the machine, the casing being so arranged as to cover the parallel numbers on the wheel which are not to be seen. Said wheel is returned to its normal position after operation by a coiled spring M', one end of which is affixed to the wheel near its periphery, and the other end to a point on the front of the frame.

On the right hand end of the shaft E, is a crank, or handle, $M^5$, and on the inner side of this crank, or handle, is a socket or slot $M^2$, which is designed to be engaged by a pin P, located on the right hand side of the hub of the indicator wheel, upon the endwise movement of the latter upon the shaft E. A spring $M^4$, coiled around said shaft, between the crank and the indicator wheel, serves to normally hold said pin out of engagement, and permits the shaft E, to return, leaving the indicator in position to display the amount of the last transaction. The indicator is retained in said position by a spring pressed pawl $m$, pivoted upon the rod B which engages a toothed wheel N on the left-hand portion of the indicator hub. Between said toothed wheel N, and the indicator, is an arm N', which extends upwardly and rearwardly from the hub of the indicator wheel, toward the back of the machine, and is arranged to come in contact with the arm H', upon which rests the pawl H, raising said pawl from engagement with the toothed wheel $E^2$, and leaving the shaft free to move when the key lever is depressed. Said bail bar F swings on the rod or shaft B, upon which the key-levers are fulcrumed, and is common to all of said levers, resting upon the same when in normal position, in which position it is held, and to which returned, after the end of the operation, by a spring $N^2$, fastened to the case, or lower portion of the machine. From about the central portion of said bail bar, there extends, at right angles, toward the back of the machine, an arm O, which carries at its rear end a suitable hammer for striking a gong, or bell, O', when said bar is drawn back by its spring to its normal position. There also projects from said bar a second arm $O^2$, normally resting on the arm H', and extending in an upward and backward direction, with a curve so arranged as to clear the shaft E, but to come in contact with, and depress, the arm H', and consequently the pawl H, when the bail bar is returning to normal position. A third and lateral arm $O^3$ on said bar raises the pawl $m$, upon the depression of any one of the key levers, and the consequent rise of the bail bar which also lifts the pawl C' that acts upon the toothed wheel $E^4$, thus leaving the shaft E and its crank free to move.

R, is a lever, fulcrumed at $r$, and resting at one end upon the arm O, which operates it. Said lever runs parallel with the back frame of the machine, and its right hand portion forms a push arm which is curved toward the inner flange or side of the toothed wheel N, with which it engages. This engagement, upon the depression of any key, slides the indicator along the shaft, so that its pin P enters the socket or slot M² in the crank, and effects the connection between said indicator and shaft. S is a stop bar which limits the downward movement of the key levers.

From the foregoing it will be observed that in order to operate the machine in order to register a transaction, it is necessary first to depress the key corresponding to the amount to be registered. The mechanical effect following this depression is the raising of the bail bar F, the consequent lifting of the pawls $m$ and G' from the wheels N and E⁴, the operation of the push lever R, by the arm O of the bail bar, said lever causing the endwise movement of the indicator into engagement with the shaft E and its crank, and the engagement of the arm N' with the arm H', raising the pawl H from the wheel E².

The key lever is held in its depressed position by its spring pawl D', and remains so depressed until the crank M⁵, now free to move, is operated, whereupon the proper stop or lug $a$, on the shaft E, coming in contact with the end of the depressed lever, forces the same back to its original position. The bail bar F is now drawn back by its spring, the pawls G' and $m$ lock the wheels E⁴ and N, through spring action, and the pawl H engages with the wheel E², being forced down by the descending arm O² acting upon the arm H' controlling said pawl H. In the meantime, as soon as the shaft has been carried its required movement and the bail bar descends, the indicator and its toothed wheel N is freed from the push arm of the lever R and slides back along the shaft under the action of the spring M⁴, leaving said indicator in position to show the number representing the amount last registered, being held by the spring pawl $m$. The movement of the shaft E is transferred to the adding wheels through the bevel gear connection described. It will therefore be apparent, that in order to register any sum, one has only to depress the key representing the same, and turn the crank, when the amount is at once indicated at the front and back of the machine, and added to the sum of the previous transactions—and the amount of the last purchase remains in view until the next transaction, when the indicator automatically returns to zero in position to indicate the next.

Having thus described my invention, what I claim as new, and desire to secure by Letters Patent, is—

1. In an accounting machine, the combination with a series of key levers, of a rotary shaft having a series of graduated stops thereon for returning said levers to their normal positions, and for limiting the movement of said shaft, an indicating disk and its attachments, and adding mechanism, substantially as specified.

2. In an accounting machine, the combination with a series of key levers, of a rotary shaft having thereon a graduated series of lugs or stops, said lugs or stops being arranged to engage with said levers and return them to normal position and also to limit the movement of said shaft toothed wheels on said shaft and their pawls, an indicator wheel loosely mounted on said shaft, and a series of adding wheels and their actuating mechanism, substantially as specified.

3. In an accounting machine, the combination with a series of key levers, and their double-acting spring pawls, of a rotary shaft having lugs along its circumference designed to engage with the ends of the respective key levers when the latter are operated, and thereby limit the movement of said shaft, said lugs being arranged also to return said levers to normal position upon the rotation of said shaft the toothed wheels on said shaft and their holding pawls, an indicating wheel actuated by said shaft, and a series of adding wheels also actuated from said shaft, substantially as specified.

4. In an accounting machine, the combination with a series of key levers, a series of double-acting spring pawls for said key-levers and the bail bar common to all of said levers and actuated by any one of them, of the rotary shaft having the graduated stops or lugs thereon for engagement with said key levers, and acting to return said levers to their normal position, and also to limit the movement of said shaft and indicator loosely mounted on said shaft, and mechanism operated by said bail bar to effect an engagement between said indicator and shaft upon the depression of any key, substantially as specified.

5. In an accounting machine, the combination with a series of key levers, their double-acting spring pawls, and a bail bar common to all of said series of levers, and operated by any one thereof, of a rotary shaft having a series of lugs or stops thereon and a series of toothed wheels, pawls for engagement with said wheels, an indicator wheel loosely mounted upon said shaft, mechanism operated by said bail bar for operating said pawls and for effecting the engagement of said indicator wheel with its shaft upon the depression of any key, and adding mechanism also operated from said shaft, substantially as specified.

6. In an accounting machine, the combination of a series of key levers, their spring pawls, a bail bar common to all of said levers, a shaft having a series of stops thereon and a series of toothed wheels, the pawls for said wheels, an indicator wheel loosely mounted upon said shaft, a levered push arm operated by said bail bar to effect an endwise movement of said indicator wheel, a return spring therefor, and adding mechanism, substantially as specified.

7. In an accounting machine, the combination with a series of key levers, their double-acting spring pawls, and a swinging bail bar common to all of said levers and resting thereon, of a rotary shaft having a series of lugs thereon in position to engage respectively the respective key levers, when the latter are depressed, said lugs also serving as stops for said shaft, and to return said levers, an indicator loosely mounted on one end portion of said shaft and capable of an endwise sliding movement thereon into and out of engagement therewith, the push lever actuated by said bail bar to effect the movement of said indicator in one direction, the spring for effecting the opposite movement, a bevel toothed wheel on the opposite end portion of said shaft, a pawl and ratchet connection between said wheel and shaft, adding mechanism geared to said bevel toothed wheel, a series of intermediate toothed wheels upon said shaft, their holding pawls, and mechanism operated by said bail bar for controlling said pawls and for operating said push lever, substantially as specified.

8. In an accounting machine, the combination of the rotary shaft, its stop lugs disposed at different points along and around the circumference, the toothed wheels thereon, their retaining pawls, the adding mechanism geared to said shaft, the indicator loosely mounted thereon, a series of pivoted key levers, a bail bar common to all said key levers, and mechanism in connection with, and operated by, said bail bar for effecting the engagement of the said indicator with its shaft, and for controlling said pawls, substantially as specified.

9. In an accounting machine, the combination with the series of key levers, the swinging bail bar common to all of said levers, and the holding pawls for said levers of the shaft E, having the graduated stop lugs thereon, the reversely toothed wheels $E^3$ and $E^4$, their holding pawls, the wheel $E^2$, its holding pawl, the indicator M loosely mounted on said shaft and carrying a pin adapted to engage with said shaft upon the endwise movement of said wheel, the toothed wheel N carried by said indicator, the pawl therefor, mechanism operated by said bail bar for controlling the action of said pawls, and for effecting the endwise movement of said indicator in one direction, the spring for effecting the opposite movement, the returning spring, and means for operating said shaft, substantially as specified.

10. In an accounting machine, the combination with the shaft E, which actuates the indicating and the adding mechanism, of the reversely toothed rigidly mounted wheels near one extremity of said shaft, their spring pawls having a reciprocal action, a third toothed wheel near the other extremity of said shaft, a pawl therefor, a pivoted support for said pawl, and mechanism operated by the operation of any key for controlling the action of said pawls, substantially as specified.

11. In an accounting machine, the combination with the key levers, and with the rotary shaft E having the series of lugs or stops adapted to engage said levers, of the series of rigidly mounted toothed wheels on said shaft, their holding pawls, a bail bar common to all the key levers, a series of arms on said bail bar for controlling the operation of said pawls, mechanism operated by said arms, and a gong or bell arranged to be sounded by one of said arms, substantially as specified.

12. In an accounting machine, the combination with the shaft E, of the indicator wheel loosely mounted thereon, the toothed wheel on the hub of said indicator wheel, the holding pawl therefor, the levered push arm, the crank or handle on the end of said shaft, a socket or slot therein adapted to be engaged by a pin on said indicator upon the endwise movement of the latter, a spring interposed between said indicator and crank, and a retracting spring for said wheel, substantially as specified.

13. The combination with the shaft E, of the indicator wheel loosely mounted thereon, said wheel having a double series of numerals upon its circumference, the toothed wheel on the hub of said indicator, the engaging pawl, the fork, the levered push arm, the returning spring, the crank, and the spring interposed between said crank and indicator, substantially as specified.

14. An accounting machine, comprising a series of key levers, their finger pieces, their double acting spring pawls and stop bar, a rotary shaft having a series of graduated stops thereon adapted to engage with said key levers, a series of toothed wheels rigidly mounted on said shaft, their holding pawls, adding mechanism geared to said shaft, an indicator wheel loosely mounted on said shaft, a bail bar common to all of said key levers and resting thereon, mechanism operated by said bail bar for controlling said pawls, and for throwing said indicator wheel into engagement with its shaft, the spring for effecting the disengagement of said indicator, means for operating said shaft, and the supporting and inclosing frame, substantially as specified.

In testimony whereof I affix my signature in presence of two witnesses.

HENRY G. O'NEILL.

Witnesses:
RALPH S. WENTWORTH,
J. H. CONCANNON.